United States Patent
Lim et al.

(10) Patent No.: US 10,903,533 B2
(45) Date of Patent: Jan. 26, 2021

(54) BATTERY MODULE

(71) Applicant: SK INNOVATION CO., LTD., Seoul (KR)

(72) Inventors: Ji Hoon Lim, Daejeon (KR); Kwan Yong Kim, Daejeon (KR); Young Ki Kim, Daejeon (KR); Gyu Jin Chung, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 150 days.

(21) Appl. No.: 16/188,798

(22) Filed: Nov. 13, 2018

(65) Prior Publication Data
US 2019/0148799 A1 May 16, 2019

(30) Foreign Application Priority Data
Nov. 10, 2017 (KR) ........................ 10-2017-0149608

(51) Int. Cl.
*H01M 4/02* (2006.01)
*H01M 10/613* (2014.01)
*H01M 2/10* (2006.01)
*H01M 10/48* (2006.01)
*H01M 10/42* (2006.01)
*H01M 10/6551* (2014.01)

(52) U.S. Cl.
CPC ....... *H01M 10/613* (2015.04); *H01M 2/1022* (2013.01); *H01M 10/425* (2013.01); *H01M 10/482* (2013.01); *H01M 10/6551* (2015.04)

(58) Field of Classification Search
CPC .................................................... H01M 4/02
See application file for complete search history.

(56) References Cited

U.S. PATENT DOCUMENTS

| | | | |
|---|---|---|---|
| 2013/0323564 A1* | 12/2013 | Beyerle, II | H01M 10/6555 429/120 |
| 2016/0126531 A1 | 5/2016 | Kim et al. | |
| 2016/0372805 A1* | 12/2016 | Kim | H01M 10/6568 |

* cited by examiner

Primary Examiner — Jacob B Marks
(74) Attorney, Agent, or Firm — IP & T Group LLP (57) ABSTRACT

Provided is a battery module, and more particularly, a battery module capable of improving cooling efficiency of battery cells and uniformly cooling the battery cells by reducing a contact resistance between a cooling fin and a heat sink, by allowing the cooling fin to be coupled and fixed to the heat sink so that the cooling fin which is in contact with the battery cell to conduct heat is in close contact with the heat sink for radiating the heat.

9 Claims, 8 Drawing Sheets

BATTERY MODULE

CROSS-REFERENCE TO RELATED APPLICATIONS

This application claims priority under 35 U.S.C. § 119 to Korean Patent Application No. 10-2017-0149608, filed on Nov. 10, 2017, in the Korean Intellectual Property Office, the disclosure of which is incorporated herein by reference in its entirety.

TECHNICAL FIELD

The following disclosure relates to a battery module that may improve cooling efficiency of a battery cell by reducing a contact resistance between a cooling fin which is in contact with the battery cell to conduct heat and a heat sink for radiating the heat.

BACKGROUND

In general, since a battery is required to have properties of nigh output and large capacity, it is formed in a form of a battery module or a battery pack in which a plurality of battery cells are stacked.

In addition, when the battery module or the battery pack is charged and discharged, the battery cells generate heat. Therefore, the battery module or the battery pack is cooled by various methods. In recent years, an indirect liquid cooling method is preferred because of high space efficiency thereof.

In the indirect liquid cooling method, cooling fins are in contact with the battery cells and are in contact, with a heat sink, such that a heat exchange is performed.

Conventionally, since a required capacity of the battery is not large, a form of the battery cell is not long. In addition, even in the case of a battery having a large capacity, the form, of the battery cell is formed in a square shape rather than a rectangular shape, so that even if only a heat conductive pad is interposed between the cooling fin and the heat sink, there is no problem, in cooling the battery cell.

However, in recent years, as heights of the battery module and the battery pack are decreased and a high capacity battery is required, a length of the battery cell has been increased, a height thereof has been, decreased, and a size thereof has been increased.

Accordingly, it is impossible to evenly distribute a contact resistance by only the heat conductive pad which is conventionally used, and as a contact area between the cooling fins and the heat sink is increased to increase the contact resistance, there is a problem that the cooling efficiency is lowered.

In addition, the conventional battery pack has a structure in which the heat sink is coupled and fixed to a pack case and the battery module is coupled and fixed to the pack case in a state in which the battery module is put on the heat sink. Therefore, since the battery module and the heat sink are not coupled to each other but are only in contact with each other, there is a problem that the battery module and the heat sink collide with each other during vibration.

RELATED ART DOCUMENT

Patent Document

US 2016/0126531 A1 (Published on May 5, 2016)

SUMMARY

An embodiment of the present invention is directed to providing a battery module capable of improving cooling efficiency of a battery cell by reducing a contact resistance between a cooling fin which is in contact with the battery cell to conduct heat and a heat sink for radiating the heat.

In one general aspect, a battery module includes a plurality of battery cells arranged to be stacked; a cooling fin including a heat conductive plate disposed between neighboring battery cells and being in contact with the battery cells, a heat radiating part extending from an end portion of the heat conductive plate and disposed to externally protrude from the battery cells, and fastening parts formed at the heat radiating part; a heat sink which is in contact with the heat radiating part of the cooling fin; and fastening means coupled to the fastening parts of the cooling fin to bring the radiating part of the cooling fin into close contact with the heat sink.

The fastening parts of the cooling fin may be formed at both sides of the heat radiating part in a length direction and between both sides of the heat radiating part.

The heat sink may have through holes formed in positions corresponding to the fastening parts of the cooling fin and penetrating through opposite surfaces of the heat sink, and the fastening means may be fastened to the fastening parts of the cooling fin through the through holes of the heat sink.

The cooling fin may further include a frame member formed along a circumference of the heat conductive plate so as to surround an edge portion of the heat conductive plate and coupled to the heat conductive plate, the heat radiating part, and the fastening parts, and the frame member may be formed so that the radiating part and the fastening parts are exposed or protrude externally from the frame member.

The heat conductive plate, the heat radiating part, and the fastening parts of the cooling fin may be formed integrally with the frame member by an insert-injection.

Coupling holes penetrating through opposite surfaces of the heat conductive plate may be formed in the heat conductive plate, such that a portion of the frame member may pass through the coupling holes and be coupled to the heat conductive plate.

The fastening parts may be disposed to be spaced apart from the heat conductive plate and the heat radiating part and be coupled to the frame member.

The cooling fin may have a cut part in which the heat conductive plate adjacent, to the fastening parts and a portion of the heat radiating part are removed.

The fastening part may have a screw thread formed on a hollowed inner circumferential surface thereof, and a coupling groove which is concavely formed in an outer circumferential surface thereof.

The fastening parts of the cooling fin may protrude to the heat sink from surfaces at which the heat radiating part and the heat sink are in contact with each other, such that the fastening parts may be inserted into through holes of the heat sink and are coupled thereto.

The battery module may further include a heat conductive pad interposed between the heat radiating part of the cooling fin and the heat sink.

[Detailed Description of Main Elements]

| | |
|---|---|
| 1000: battery module | |
| 100: battery cell | |
| 110: electrode tap | |
| 200: cooling fin | |
| 210: heat conductive plate | 211: coupling hole |
| 220: heat radiating part | 221: cut part |
| 230: fastening part | 231: coupling groove |
| 240: frame member | 250: case fastening part |
| 300: heat sink | |
| 310: through hole | |
| 400: fastening means | |
| 500: cover | |
| 600: heat conductive pad | |

DETAILED DESCRIPTION OF EMBODIMENTS

Hereinafter, a battery module according to an exemplary embodiment of the present invention as described above will be described in detail with reference to the accompanying drawings.

Figure 1:
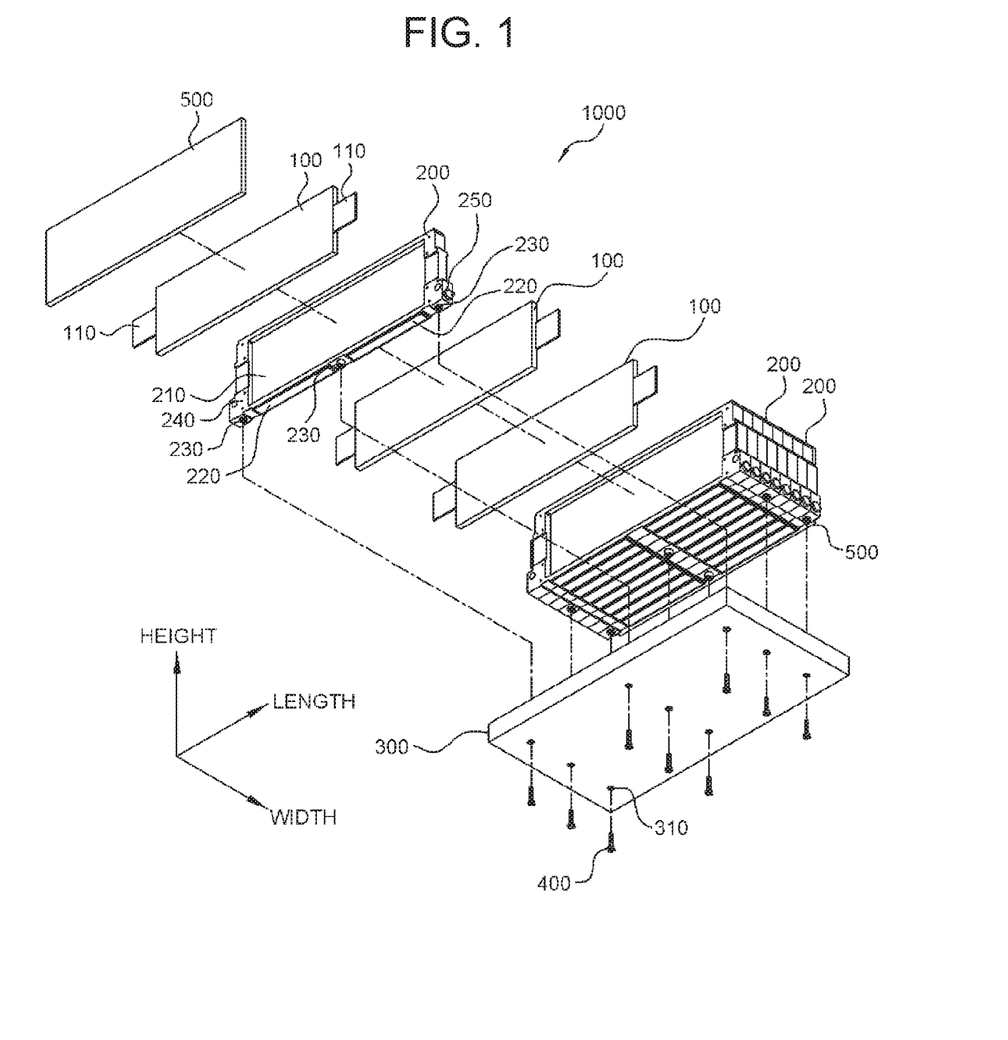
FIG. 1 is an exploded perspective view illustrating a battery module according to an exemplary embodiment of the present invention.
Figure 2:
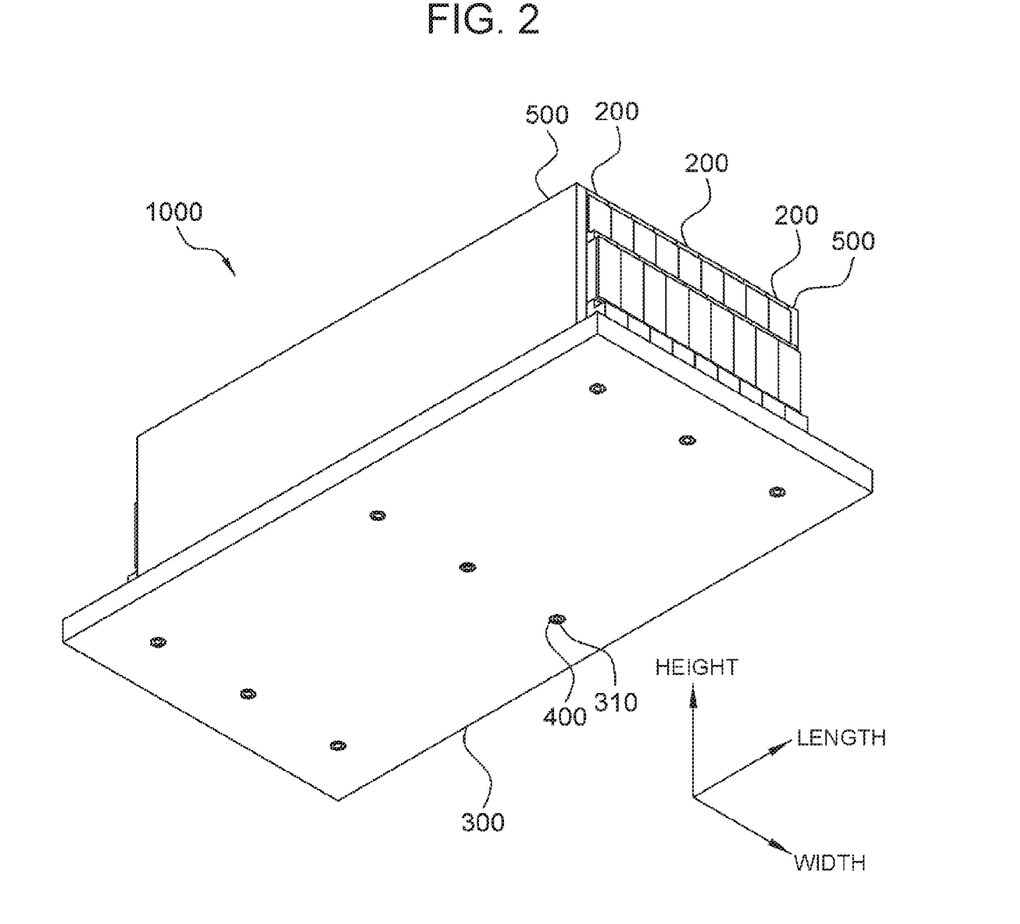
FIG. 2 is an assembly perspective view illustrating the battery module according to an exemplary embodiment of the present invention.
Figure 3:
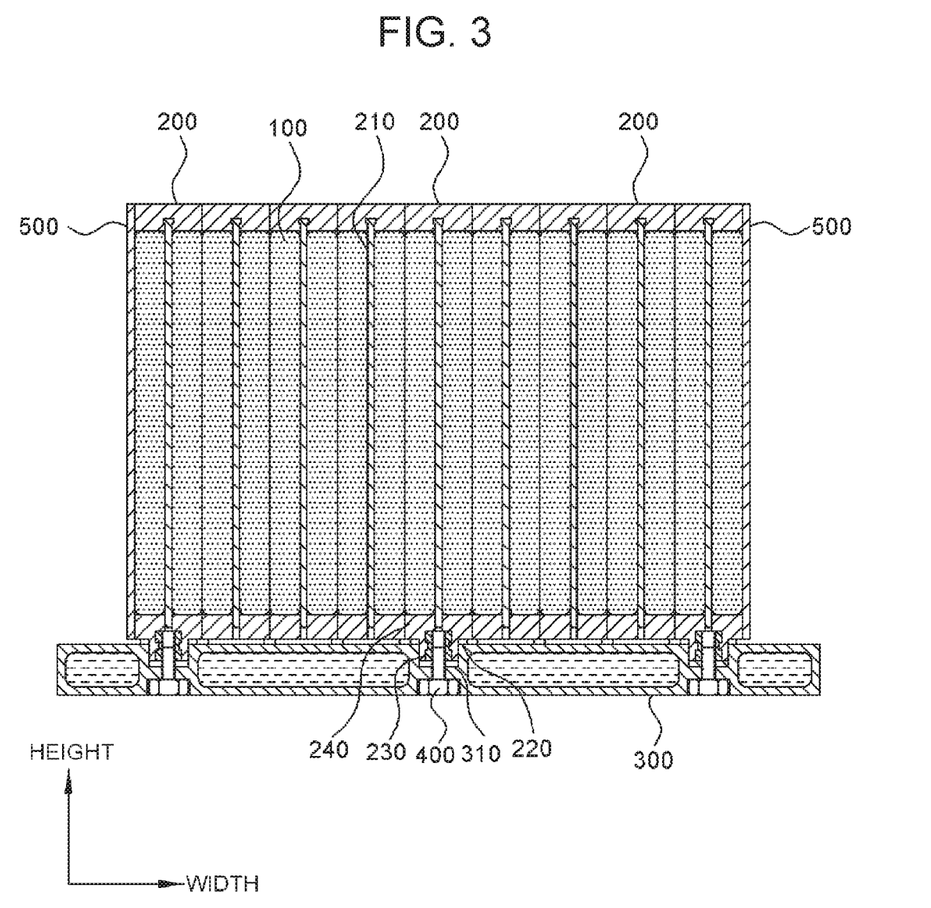
FIG. 3 is a cross-sectional view illustrating the battery module according to an exemplary embodiment of the present invention.
Figure 4:
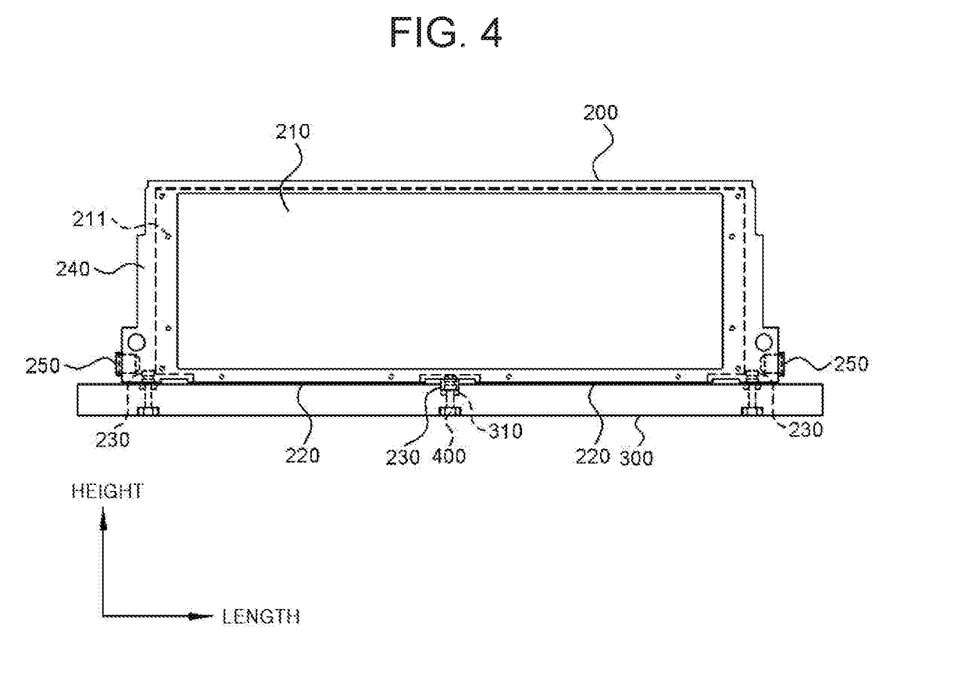
FIG. 4 is a side view illustrating a coupled structure of a cooling fin and a heat sink of the battery module according to an exemplary embodiment of the present invention.

FIGS. 1 to 3 are an exploded perspective view, an assembly perspective view, and a cross-sectional view illustrating a battery module according to an exemplary embodiment of the present invention, and FIG. 4 is a side view illustrating a coupled structure of a cooling fin and a heat sink of the battery module according to an exemplary embodiment, of the present invention.

As illustrated, a battery module 1000 according to an exemplary embodiment of the present invention may include a plurality of battery cells 100 arranged to be stacked; cooling fins 200 in which a heat conductive plate 210 is disposed between neighboring battery cells 100 and is in contact with the battery cells 100, a heat radiating part 220 extending from an end portion of the heat conductive plate 210 is disposed to externally protrude from the battery cells 100, and fastening parts 230 are formed at opposite sides of the heat radiating part 220 in a length direction and between the opposite sides of the heat radiating part 220; a heat sink 300 which is in contact with the heat radiating parts 220 of the cooling fins 200 and in which through holes 310 penetrating through opposite surfaces thereof are formed in positions corresponding to the fastening parts 230 of the cooling fins 200; and fastening means 400 fastened to the fastening parts 230 of the cooling fins 200 through the through holes 310 of the heat sink 300 to bring the radiating parts 220 of the cooling fins 200 into close contact with the heat sink 300.

The battery cell 100 may be formed, for example, in a plate shape in which lengths of the battery cell in a height direction and a length direction thereof is greater than a thickness of the battery cell in a width direction thereof. As illustrated, the battery cell may be formed in a rectangular shape in which the length of the battery cell in the length direction thereof is greater than that in the height direction. In addition, the battery cell 100 may be a pouch type cell in which anode and cathode electrode tabs 110 are led to the outside of a pouch formed to enclose and seal the outside of an electrode assembly. In addition, the battery cells 100 may be disposed in parallel to each other so as to be arranged along the width direction thereof.

The cooling fin 200 is a portion which is in contact with the battery cell 100 to serve to transfer heat generated in the battery cell 100 by conduction. The cooling fin 200 may be disposed between neighboring battery cells 100 and may be in contact with the battery cells 100 to be in close contact with each other, and the cooling fin 200 may be formed of a metal material having high thermal conductivity such as aluminum, copper, or the like. In addition, the cooling fin 200 may have a neat radiating part 220 formed to be perpendicular to the heat conductive plate 210, at a lower end portion of the heat conductive plate 210 in a height direction of the conductive plate 210, which is a portion disposed in parallel to face the battery cell 100 and contacting the battery cell 100. In this case, the heat conductive plate 210 is formed in the rectangular shape, which is a shape corresponding to the shape of the battery cell 100 and may be formed in a flat plate shape in which lengths of the heat conductive plate 210 in the height direction and the length direction thereof are greater than a thickness of the heat conductive plate 210 in the width direction thereof. In addition, the heat radiating part 220 extends to both sides in the width direction from the lower end of the heat conductive plate 210, such that the heat radiating part 220 may be formed in a shape of "⊥" at the lower end of the heat conductive plate 210. In addition, as illustrated, the heat conductive plate 210 and the heat radiating part 220 may be integrally formed without a coupled portion with one material, and may also be separately formed and are then coupled to each other to be integrally formed. Accordingly, the heat conductive plate 210 is disposed between the neighboring battery cells 100 such that the heat conductive plate 210 may be in contact with the battery cells 100, and the heat radiating part 220 extending from the lower end of the heat conductive plate 210 may be disposed to protrude externally from the battery cells 100. In addition, the cooling fin 200 may have the fastening parts 230 formed at opposite sides in the length direction at a lower side in the height direction in which the heat radiating part 220 is formed, and the fastening part 230 may be further formed between the fastening parts 230 formed at the opposite sides in the length direction. In this case, the fastening parts 230 may be formed, for example, as bolts, nuts, or the like, and the fastening parts 230 are formed as the nuts, such that the fastening parts 230 may be formed at a lower end of the cooling fin 200. In addition, one or more fastening parts 230 are formed at positions between the fastening parts 230 formed at both end portions in the length direction, such that three or more fastening parts 230 may be formed in the length direction of one cooling fin 200.

The heat sink 300 is a portion which is in contact with the cooling fin 200 to radiate the heat transferred through the cooling fin 200. For example, a method may be used in which a fluid is filled in the heat sink 300 or the fluid flows and is circulated along the inside of the heat sink to cool the heat sink 300. In addition to this, the heat sink 300 may be formed in various forms. In addition, the heat sink 300 may be disposed to be in contact with the heat radiating part 220 of the cooling fin 200. Here, the heat sink 300 may have the through holes 310 penetrating through upper and lower surfaces and formed in positions corresponding to the fastening parts 230 of the cooling fin 200.

The fastening means 400 may be formed, for example, bolts or the like, and may be fastened and coupled to the nuts, which are the fastening part 230 formed at the cooling fin 200. That is, the fastening means 400 are inserted into the through holes 310 of the heat sink 300 in an upper side direction from a lower side direction of the heat sink 300, such that upper sides of the fastening means 400, which may be male screw portions of the bolts, may be fastened to the fastening parts 230 through the through holes 310 and lower sides of the fastening means 400, which may be head portions of the bolts, may be fastened to the heat sink 300 so as to be caught with the heat sink 300. Accordingly, the cooling fin 200 and the heat sink 300 may be firmly coupled to each other by the fastening parts 230 of the cooling fin 200 and the fastening means 400 coupled to the fastening parts 230, and the surfaces in which the heat sink 300 and the heat radiating part 220 are in contact with each other may be in close contact with each other.

Accordingly, the surfaces in which the heat sink 300 and the heat radiating part 220 are in contact with each other may be in close contact with each other by the fastening parts and the fastening means not only at both sides in the length direction of the cooling fin 200 but also at the position between both sides in the length direction of the cooling fin 200, such that contact resistance at the portion in which the heat sink 300 and the cooling fin 200 are in contact with each other may be reduced. Accordingly, cooling efficiency of the battery cell may be improved, a uniform cooling may be performed in the length direction in the battery cell 100 which is in contact with one cooling fin 200, and when the battery module 1000 includes the plurality of battery cells 100 and the plurality of cooling fins 200, the plurality of battery cells may be uniformly cooled.

Figure 5:
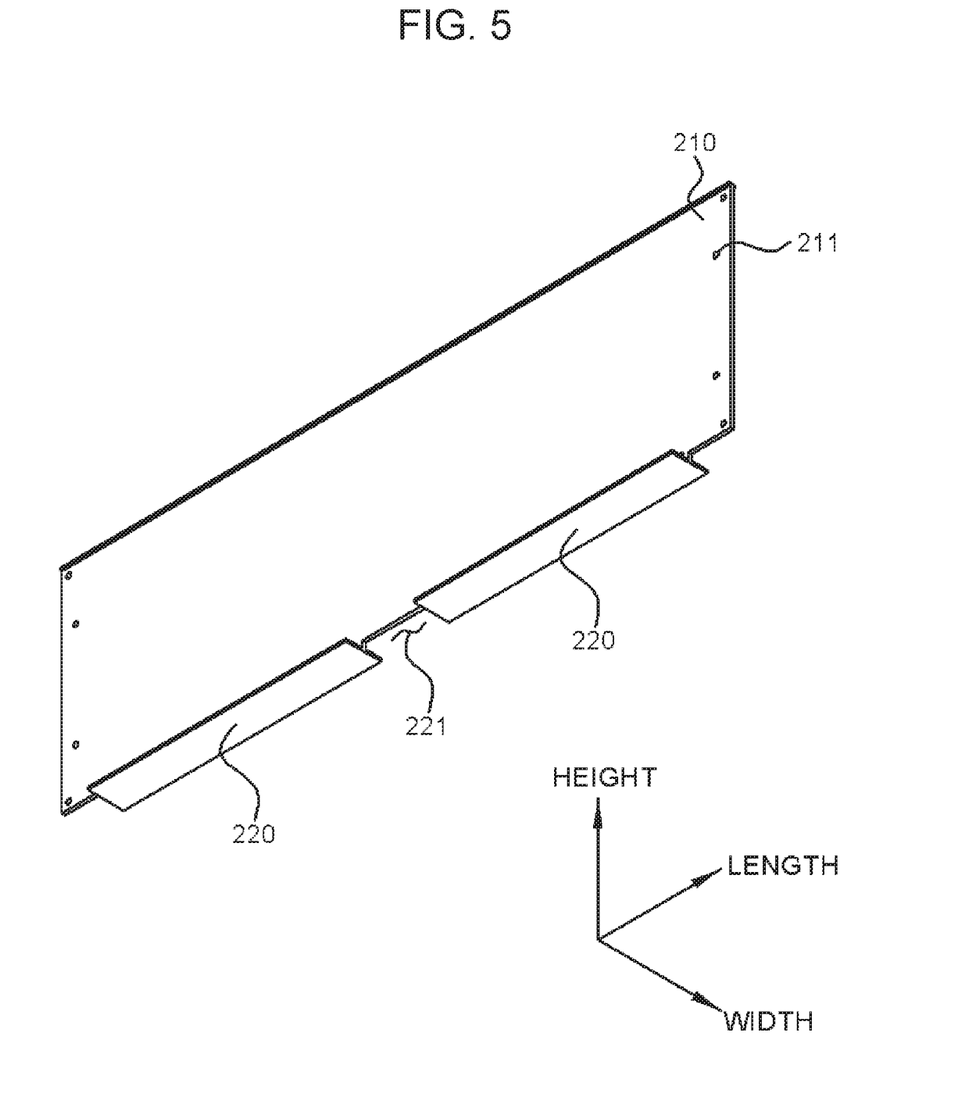
FIG. 5 is a perspective view illustrating a heat conductive plate and a neat radiating part of the battery module according to an exemplary embodiment of the present invention.
Figure 6:
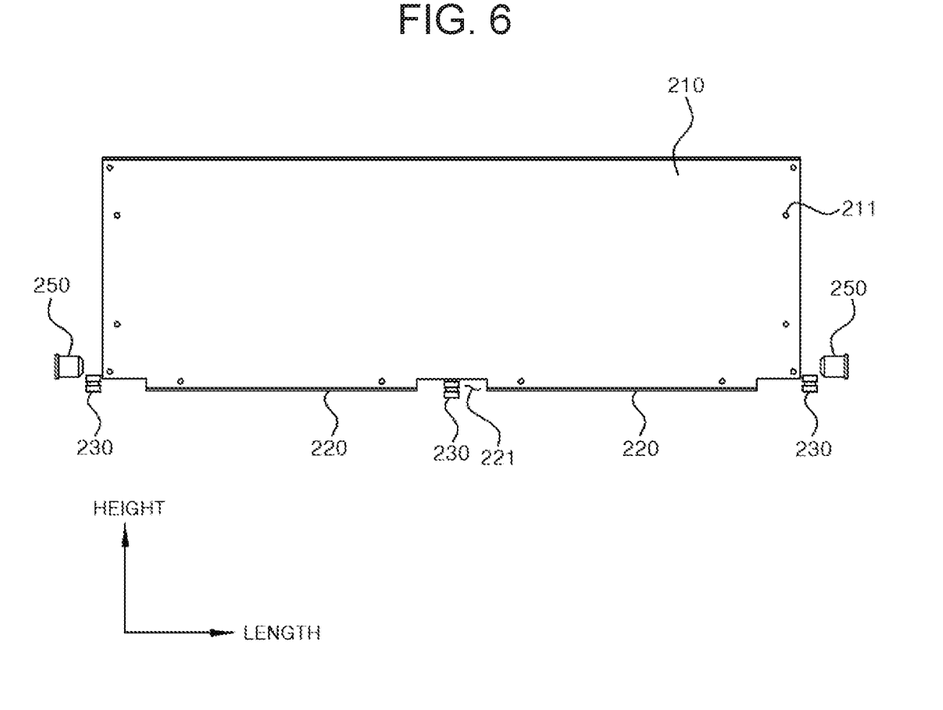
FIG. 6 is a perspective view illustrating an arrangement before the heat conductive plate, the heat radiating part, and a fastening part are insert-injected with a frame in the battery module according to an exemplary embodiment of the present invention.
Figure 7:
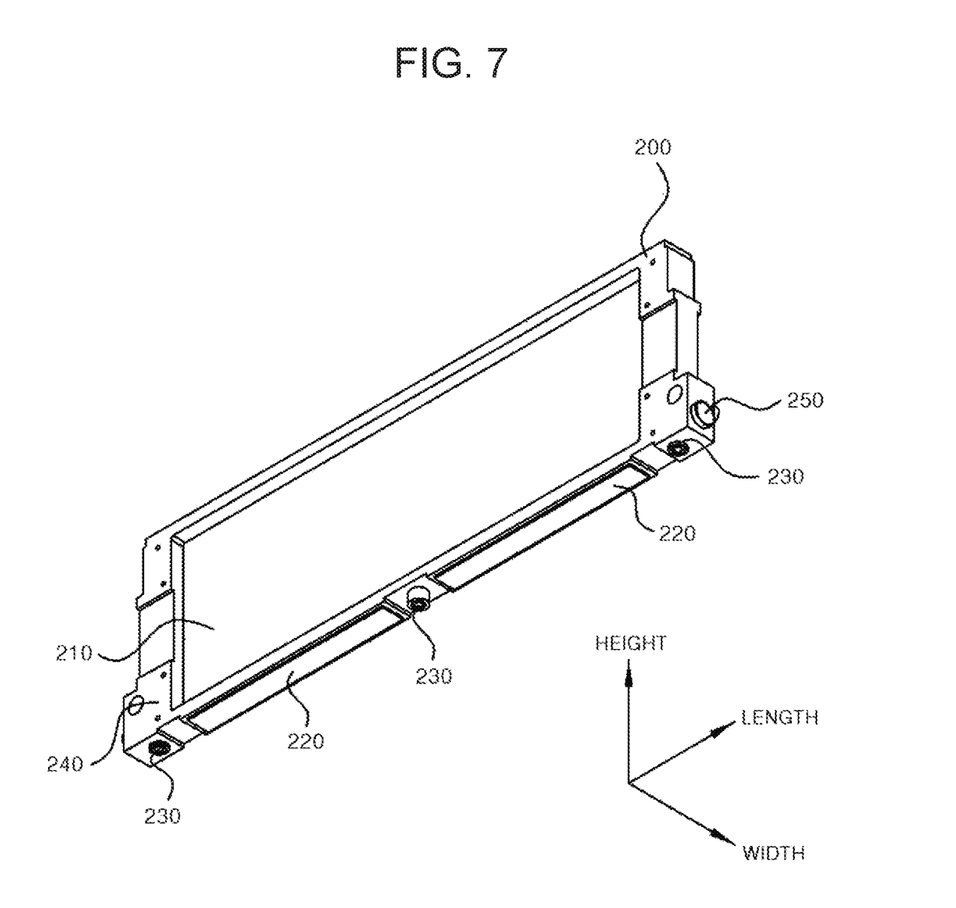
FIG. 7 is a perspective view illustrating a cooling fin formed integrally by the insert-injection in the battery module according to an exemplary embodiment of the present invention.
Figure 8:
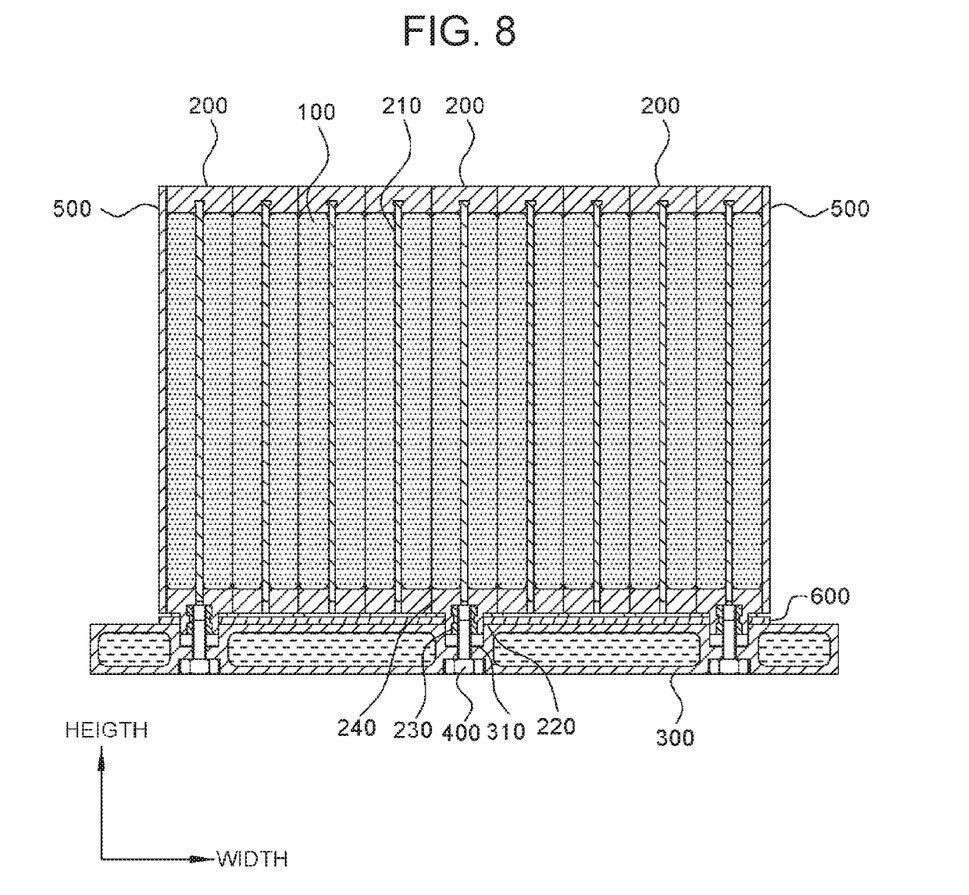
FIG. 8 is a cross-sectional view illustrating an example in which a heat conductive pad is interposed between the heat radiating part of the cooling fin and the heat sink in the battery module according to an exemplary embodiment of the present invention.

FIG. 5 is a perspective view illustrating a heat conductive plate and a heat radiating part of the battery module according to an exemplary embodiment of the present invention. FIG. 6 is a perspective view illustrating an arrangement before the heat conductive plate, the heat radiating part, and a fastening part are insert-injected with a frame in the battery module according to an exemplary embodiment of the present invention, and FIG. 7 is a perspective view illustrating a cooling fin formed integrally by the insert-injection in the battery module according to an exemplary embodiment of the present invention.

As illustrated, the cooling fin 200 may further include a frame member 240 formed along a circumference of the heat conductive plate 210 so as to surround an edge portion of the heat conductive plate 210 and coupled to the heat conductive plate 210, the neat radiating part 220, and the fastening parts 230, and the frame member 240 may be formed so that the radiating part 220 and the fastening parts 230 are exposed or protrude externally from the frame member 240.

That is, the cooling fin 200 may be configured to include the heat conductive plate 210, the heat radiating part 220, the fastening parts 230, and the frame member 240. For example, since the frame member 240 is formed along the circumference of the heat conductive plate 210 so as to surround the edge portion of the heat conductive plate 210, the frame member 240 may be formed to surround the entirety of the circumference of the heat conductive plate 210 in the height direction and the length direction thereof. In this case, the frame member 240 formed at a circumference portion of an upper side in the height direction of the heat conductive plate 210 may be formed to surround opposite surfaces of the heat conductive plate 210 in the width direction thereof and a surface of the heat conductive plate 210 in the height direction thereof. Similarly, the frame member 240 formed at circumference portions of both sides in the length direction of the heat conductive plate 210 may be formed to surround the opposite surfaces of the heat conductive plate 210 in the width direction thereof and a surface of the heat conductive plate 210 in the length direction thereof. In addition, since the heat radiating part 220 is formed at the circumference of the lower side of the heat conductive plate 210 in the height direction thereof, the frame member 240 may be formed to surround the opposite surfaces of the lower side of the heat conductive plate 210 in the width direction thereof. Accordingly, inner side portions in the height direction and the length direction in which the frame member 240 is formed may be formed so that the surface of the heat conductive plate 210 in the width direction thereof is exposed to the outside, the battery cell 100 may be inserted into a concave space formed in an inner side of the frame member 240 and be seated thereon, and the battery cell 100 may be coupled to the cooling fin 200 so as to be in contact with the heat conductive plate 210.

Here, a portion including the lower surface of the heat radiating part 220 may protrude or be exposed to a lower side from the lower surface of the frame member 240 in the height direction thereof, and a portion including the lower surface of the fastening part 230 may protrude or be exposed to the lower side from the lower surface of the frame member 240 in the height direction thereof. Accordingly, the lower surface of the heat radiating part 220 may be easily in contact with an upper surface of the heat sink 300 and may be certainly in close contact with the upper surface of the heat sink 300, and the fastening means 400 may be easily fastened and coupled to the fastening parts 230.

In addition, the heat conductive plate 210, the heat radiating part 220, and the fastening parts 230 of the cooling fin 200 may be formed integrally with the frame member 240 by an insert-injection.

That is, the heat conductive plate 210, the heat radiating part 220, the fastening parts 230, and the frame member 240 may be integrally formed by disposing the heat conductive plate 210 and the fastening parts 230 formed integrally with the heat radiating part 220 in an injection mold and injecting a molten plastic resin.

In this case, coupling holes 211 penetrating through opposite surfaces of the heat conductive plate 210 are formed in the heat conductive plate 210, such that a portion of the frame member 240 may pass through the coupling holes 211 and be coupled to the heat conductive plate 210.

That is, the coupling holes 211 spaced apart from each other along a circumference of the heat conductive plate 210 at positions spaced inwardly from the edge of the heat conductive plate 210 and penetrating through the opposite surfaces of the heat conductive plate 210 in the width direction thereof may be formed in the heat conductive plate 210, and the plastic resin passes through the coupling holes 211 of the heat conductive plate 210 during the insert-injection, such that plastic portions of both sides of the heat conductive plate 210 in the width direction thereof may be connected and coupled to each other. Accordingly, a coupling force between the heat conductive plate 210 and the frame member 240 may be improved, and the surface of the heat conductive plate 210 in the width direction thereof and the frame member 240 may not be detached or opened.

In addition, the fastening parts 230 may be disposed to be spaced apart from the heat conductive plate 210 and the heat radiating part 220, and may be coupled to the frame member 240.

That is, various numbers of fastening parts 230 are disposed at desired positions by using the fastening parts 230 which are formed separately from the neat conductive plate 210 and the heat radiating part 220 as illustrated, and the fastening parts 230 may be then coupled to the frame member 240 through the insert-injection so as to be formed integrally with the frame member 240.

In addition, the cooling fin 200 may have a cut part 221 in which the heat conductive plate 210 adjacent to the fastening parts 230 and a portion of the heat radiating part 220 are removed.

That is, as illustrated, in order to easily dispose the fastening parts 230 on both sides and a central portion of the cooling fin 200 in the length direction thereof, cut portions 221 in which a portion of the heat radiating part 220 and a portion of the heat conductive plate 210 are removed may be formed.

In addition, the fastening part 230 may have a screw thread formed on a hollowed inner circumferential surface thereof and a coupling groove 231 which is concavely formed in an outer circumferential surface thereof.

That is, the fastening part 230 may be formed as an insert nut in which a female screw thread is formed on the hollowed inner circumferential surface thereof, and may have the coupling groove 231 which is concavely formed in the outer circumferential surface thereof. Accordingly, in a case in which the frame member 240 and the fastening parts 230 are formed integrally with each other by the insert-injection, and a portion of the insert nut, which is the fastening part 230, or all of the fastening part 230 except for the lower surface thereof is formed in a form embedded in the frame member 240, since the plastic resin constituting the frame member 240 may be formed so as to be filled in the coupling groove 231 formed concavely in the outer circumferential surface of the fastening part 230, the fastening part 230 may not be easily detached from the frame member 240 when the bolt, which is the fastening means 400, rotates to be fastened to the fastening part 230 or be separated from the fastening part 230. In this case, the coupling grooves 231 formed in the outer circumferential surfaces of the fastening parts 230 may be spaced apart from each other along a circumference direction and be formed in the height direction to be in parallel to each other as illustrated. Together with this, a groove may be formed along the circumference direction between both ends of the fastening part 230 in the height direction. Besides, the coupling grooves may be formed in various forms such as a lattice form, an inclined lattice form, and the like, and the outer circumferential surface of the fastening part 230 may be formed in various forms, for example, a convex and concave form, and the like.

In addition, in the cooling fin 200, the fastening parts 230 protrude to the heat sink 300 from the surfaces at which the heat radiating part 220 and the heat sink 300 are in contact with each other, such that the fastening parts 230 may be inserted into the through holes 310 of the heat sink 300 and be coupled thereto.

That is, the cooling fin 200 may be formed so that a portion of the fastening part 230 protrudes to the lower side of the frame member 240 in the height direction thereof from the lower surface of the frame member 240, and the portion in which the portion of the fastening part 230 protrudes to the lower side of the frame member 240 from the lower surface of the frame member 240 may be formed so that the plastic resin forming the frame member 240 is coupled to the fastening part 230 in a form surrounding portions except for the lower surface of the fastening part 230. In this case, the lower side of the fastening part 230 may protrude downwardly from the lower surface of the heat radiating part 220.

Accordingly, since the fastening parts 230 protruding downwardly from the lower surface of the heat radiating part 220 are inserted into the through holes 310 of the heat sink 300 and the cooling fin 200 and the heat sink 300 are coupled to each other, central positions of the fastening parts 230 of the cooling fin 200 and central positions of the corresponding through holes 310 of the heat sink 300 are easily coincided with each other. As a result, the fastening means 400 may be easily fastened to the fastening parts 230 of the cooling fin 200 through the through holes 310 of the heat sink 300.

In addition, in the battery module 1000 according to an exemplary embodiment of the present invention as illustrated, two battery cells 100 and one cooling fin 200 form a pair, such that the battery cells 100 may be disposed to be in contact with both sides of the cooling fin 200 in the width direction thereof, respectively. In addition, the battery module 100 may be formed in a form in which a plurality of pairs are arranged along the width direction, and the battery cells 100 and the cooling fins 200 are stacked in the width direction and are in close contact with each other, and covers 500 may be disposed and stacked on the outermost portions in the width direction to be in parallel to each other. In addition, the electrode taps 110 having different polarities of neighboring battery cells 100 are connected to each other by welding, such that the plurality of battery cells 100 may be configured to be in series with each other, and electrode taps having the same polarity are connected to each other, such that the plurality of battery cells 100 may also be configured to be in parallel to each other. In addition, the battery module 1000 may include electrode terminals connected to the electrode taps 110 of the battery cells 100, and the electrode terminals may be connected to the electrode taps 110 using a bus bar or the like. In addition, the battery module 1000 may include case fastening parts 250 formed in the frame member 240 of the cooling fin 200 so as to be fixed to a pack case constituting a battery pack. For example, the case fastening parts 250 may be formed in the frame member 240 of both sides in the length direction so as to face the length direction. In this case, the case fastening parts 250 may also be formed as insert nuts and may be formed integrally with the frame member 240 by the insert-injection. In addition, a heat conductive pad for improving heat conduction may be interposed between the lower surface of the heat radiating part 220 of the cooling fin 200 and the upper surface of the heat sink 300 and may be in close contact therewith.

As described above, the battery module according to the present invention may improve the cooling efficiency of the battery cell and may uniformly cool the plurality of battery cells by reducing the contact resistance between the cooling fin and the heat sink.

The present invention is not limited to the above-mentioned exemplary embodiments, but may be variously applied. In addition, the present invention may be variously modified by those skilled in the art to which the present invention pertains without departing from the gist of the present invention claimed in the claims.

What is claimed is:

1. A battery module comprising:
   a plurality of battery cells arranged to be stacked;
   a cooling fin including a heat conductive plate disposed between neighboring battery cells and being in contact with the battery cells, and a heat radiating part extending from an end portion of the heat conductive plate and disposed to externally protrude from the battery cells;
   a frame member formed along a circumference of the heat conductive plate so as to surround an edge portion of the heat conductive plate;
   fastening parts coupled to the frame member;
   a heat sink which is in contact with the heat radiating part; and
   fastening means coupled to the fastening parts to bring the radiating part into close contact with the heat sink;
   wherein the frame member is formed so that the radiating part and the fastening parts are exposed or protrude externally from the frame member.

2. The battery module of claim 1, wherein the fastening parts are formed at both sides of the heat radiating part in a length direction.

3. The battery module of claim 1, wherein the heat sink has through holes formed in positions corresponding to the fastening parts and penetrating through opposite surfaces of the heat sink, and
   the fastening means are fastened to the fastening parts through the through holes of the heat sink.

4. The battery module of claim 1, wherein the heat conductive plate, the heat radiating part, and the fastening parts are formed integrally with the frame member by an insert-injection.

5. The battery module of claim 4, wherein coupling holes penetrating through opposite surfaces of the heat conductive plate are formed in the heat conductive plate, such that the frame member is coupled to the heat conductive plate through the coupling holes.

6. The battery module of claim 4, wherein the fastening parts are disposed to be spaced apart from the heat conductive plate and the heat radiating part.

7. The battery module of claim 4, wherein the cooling fin has a cut part in which the heat conductive plate adjacent to the fastening parts is removed.

8. The battery module of claim 4, wherein the fastening part has a screw thread formed on a hollowed inner circumferential surface thereof, and a coupling groove which is concavely formed in an outer circumferential surface thereof.

9. The battery module of claim 1, further comprising a heat conductive pad interposed between the heat radiating part and the heat sink.

* * * * *